United States Patent Office 3,225,116
Patented Dec. 21, 1965

3,225,116
HALOGENATED BORAZOLES AS GELATION INHIBITORS FOR UNSATURATED POLYESTER RESINS
Howard J. Wright and Darwin A. Dalzell, Kansas City, Mo., assignors to Cook Paint & Varnish Company, Kansas City, Mo., a corporation of Delaware
No Drawing. Filed July 16, 1963, Ser. No. 295,523
8 Claims. (Cl. 260—864)

The present invention relates to certain improvements in stabilizing polyesters and polyester compositions against premature gelation.

It is well known that polymerizable polyesters of polyhydric alcohols and $\alpha,\beta$-ethylenically unsaturated dicarboxylic acids, particularly when mixed with an ethylenically unsaturated or vinylic monomer, tend to set or gel prematurely. As a result, there have been numerous prior proposals directed towards the addition of inhibitors to these polymerizable polyesters or mixtures thereof with vinylic monomers which stabilize the composition against premature gelation to facilitate storage and yet permit rapid and effective curing to take place at the desired time when a free-radical catalyst is added. Thus, U.S. Patent 2,593,787 describes the use of quaternary ammonium salts for stabilizing polymerizable polyester compositions of the type indicated. Other efforts to stabilize these polymerizable products are described in U.S. Patents 2,570,269, 2,627,510, and 2,740,765.

The principal object of the present invention is to provide a new and improved way of stabilizing polymerizable polyesters of polyhydric alcohols and $\alpha,\beta$-ethylenically unsaturated dicarboxylic acids, and particularly mixtures of one or more of these polyesters with a vinylic monomer, against premature gelation or setting. Another object of the invention is to provide polymerizable polyesters and especially polyester/vinyl monomer mixtures of the type described in the above-mentioned patents which, although stabilized against premature gelation, can be readily and effectively cured when desired to give a highly useful and attractive thermosetting product. Other objects will also be apparent from the following detailed description of the invention.

Broadly stated, the present invention is based on the discovery that boron compounds of the following formula are outstandingly effective as gelation inhibitors for the above-mentioned polyesters and mixtures thereof with vinylic monomers.

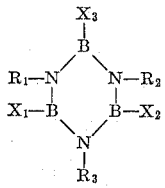

wherein $X_1$, $X_2$ and $X_3$ are halogen, the same or different; and $R_1$, $R_2$ and $R_3$ are selected from the group consisting of hydrogen, alkyl, alkoxy and aryl. The preferred compound is $\beta$-trichloroborazole, i.e. the compound wherein $X_1$, $X_2$ and $X_3$ are chlorine and $R_1$, $R_2$ and $R_3$ are hydrogen. However, $X_1$, $X_2$ and/or $X_3$ may stand for bromine, fluorine or iodine instead of chlorine. Typical alkyl values for the R substituents include methyl, ethyl, propyl, isopropyl, butyl, isobutyl, amyl, hexyl, heptyl, etc., up to 12 carbon atoms or even more. As indicated, the alkyl may be branched or straight chain. If one or more of the R substituents stand for alkoxy, this may be methoxy, ethoxy, etc., up to 12 carbon atoms or more as in the case of the alkyl substituent or substituents. Representative aryl substituents are phenyl, methyl phenyl and other alkyl phenyls, halophenyl such as chlorophenyl, naphthyl, methyl naphthyl, chloronaptyl and the like.

Boron compounds of the type referred to above are known. The preferred inhibitor $\beta$-trichloroborazole, for example, has previously been used for the polymerization of propylene (U.S. Patent 2,996,491) and may be prepared by reacting the appropriate amine with boron trichloride. The compound has a melting point of 84.5–85.5° C. and a molecular weight of 183.33.

The amount of boron compound added to the polyester or mixture thereof can be varied as desired. However, speaking generally, from 0.05% to 0.50% of $\beta$-trichloroborazole or other boron inhibitor within the scope of the invention, may be used based on the weight of polyester being stabilized.

The invention may be used to stabilize any of the polymerizable polyesters disclosed in the patents mentioned above. These polyesters may be described as unsaturated alkyd polyesters of a polyhydric alcohol and $\alpha,\beta$-ethylenically unsaturated dicarboxylic acid or a mixture of one or more of such polyesters with a vinylic monomer.

The various components used to prepare the polyesters stabilized herein are well known and are disclosed in the above patents, e.g. 2,593,787. Thus, for example, the $\alpha,\beta$-ethylenically unsaturated dicarboxylic acid used in the preparation of the polyester may be maleic acid, fumaric acid, aconitic acid, mesaconic acid, citraconic acid, ethyl maleic acid, pyrocinchoninic acid, xeronic acid and itaconic acid.

The anhydrides of these acids, where the anhydrides exist are, of course, embraced under the term "acid" since the reaction products or polyesters are the same. Often it is preferable to operate with the anhydride rather than the free acid.

The polyhydric alcohol component of the polyester may be, for example, ethylene glycol, diethylene glycol, triethylene glycol, polyethylene glycol, 1,3-dipropanediol, 1,2-propylene glycol, dipropylene glycol, neopentyl glycol, hydrogenated bisphenol A, pentaerythritol, and 1,3-butylene glycol or any mixtures thereof. Halogen substituted glycols, e.g. the monochloro derivatives are also contemplated.

The polyester composition also preferably includes a saturated dicarboxylic acid component. Representative examples of saturated acids which may be used include phthalic, isophthalic, tetrahydrophthalic, het acid, tetrachlorophthalic, tetrabromophthalic, succinic, adipic, suberic, azelaic, sebacic, diglycolic, and dimethyl succinic. As will be appreciated, anhydrides of these acids are contemplated and the term "acid" is intended to embrace the anhydrides where these exist as in the case of the unsaturated acids.

In some instances, it may be desirable to include a small amount of a drying oil acid in the polyester. Such acids impart air drying characteristics to the polyester, or the mixture of the polyester and the vinylic monomer. Appropriate drying oil acids are, among others, linolenic acid and linoleic acid or mixtures thereof.

As noted, the invention is of especial importance for stabilizing copolymerizable mixtures of one or more polyesters as described above and one or more vinylic monomers. These mixtures are much more reactive than the polyesters per se, and the stabilization of these mixtures is usually more urgent than that of the polyester. Such copolymerizable mixture may comprise any of the polyesters which have already been described and these may be incorporated with a suitable vinylically unsaturated monomer such as those referred to in the foregoing patents.

These monomers comprise any of the common vinylic compounds capable of cross linking unsaturated polyester molecules at their points of unsaturation. Usually they contain the reactive group $H_2C=C<$. The ethylenically unsaturated polyesters and the vinylically unsaturated compounds are mutually soluble. The monomeric compound is also normally a liquid, polymerizable compound. Typically suitable vinylic monomers include styrene, $\alpha$-methyl styrene, divinyl benzene, indene, methyl methacrylate, allyl acetate, diallyl phthalate, diallyl succinate, diallyl adipate, diallyl sebacate, triallyl phosphate, vinyl chloride, etc.

The vinylic monomer usually will comprise from 10 to 60% upon a weight basis of the copolymerizable mixture and mixtures containing 20 to 40 or 50% by weight of monomer are to be preferred.

In the preparation of the polyesters used herein, the polyhydric alcohol is usuallly employed in approximate molar equivalency or slightly in excess of such equivalency of the sum of the acids used. Usually, this excess will not much exceed 10 or 20% and it may be lower. The excess glycol facilitates reduction of the acid number of the polyester.

The $\alpha,\beta$-ethylenically unsaturated dicarboxylic acid may constitute the whole of the acid component of the polyester, but usually it is preferred to include at least some of one or more of the saturated acids referred to above. The amount of saturated acid utilized can be varied over a wide range and may be as high as 10–12 mols per mol of $\alpha,\beta$-ethylenically unsaturated dicarboxylic acid.

In conducting the esterification of the polyhydric alcohol and the acid or acids, conventional principles are adhered to. Acid catalysts may be added. The reaction may be conducted under an atmosphere of carbon dioxide or nitrogen gas. Xylene or other non-reactive solvent may be included and the reaction may be conducted by heating the mixture to reaction temperature, e.g. to that at which water is expelled from the system. It is continued until water ceases to evolve and the acid value of a sample is reasonably low, e.g. 5 to 100. It should not be continued so long as to result in infusibility of the polyester. Usually a temperature of 150° C. to 190° C. or 200° C. and a reaction time of 2 to 20 hours is sufficient to effect the esterification. If desired, monohydric alcohol and/or monobasic acid may be added to the reaction product of dibasic acid and dihydric alcohol after such reaction is substantially complete. Thereafter the mixture may be heated to cause further reaction and unreacted components finally distilled off. Usually, the unsaturated polyester is very viscous or even solid, but is soluble in the vinylically unsaturated monomer, at least when warmed.

It is usually preferred to add the boron stabilizer to the polyester in the absence of the vinylic monomer even if a mixture with the monomer is to be ultimately prepared. To this end, the stabilizer is preferably incorporated by adding it with one of the components used to prepare the polyester, e.g. with the polyhydric alcohol or dibasic acid. As an alternative, the stabilizer may be added to the polyester. In either case, the stabilizer may be added as such or dissolved in an appropriate solvent, e.g. styrene.

The vinylic monomer, if used, should be added after the polyester reaction has been completed. Advantageously, this addition is carried out with the polyester at a slightly lower temperature, e.g. 120° C. or even lower.

Since the unsaturated polyesters are usually quite viscous or even solid at room temperature, they should be sufficiently warm to mix with and dissolve in the monomeric or vinylically unsaturated compound. The resultant mixtures, which should be essentially free from water, remain stable in storage over long periods of time. However, when curing is desired, an appropriate curing catalyst such as diacyl aromatic peroxides, diacyl aliphatic peroxides, ketone peroxides and aldehyde peroxides can be added to the stabilized mixture in appropriate amount (.01 to 5% by weight). As representative of these catalysts there may be mentioned e.g. benzoyl peroxide, tertiary butyl hydroperoxide, cumene hydroperoxide, cyclohexyl hydroperoxide, methyl ethyl ketone peroxide, cyclohexanone peroxide, acetyl peroxide, lauroyl peroxide, or the like.

The end use and the catalyst employed will determine the composition of the mixture and the curing conditions which are used. Such mixture will cure rapidly and completely with no interference from the inhibitor. The temperature of cure can be moderate, e.g. below 100° C., but may be much lower, e.g. room temperature (22° C.) or thereabouts. The resins may be further hardened by heating them at 125° C. to 150° C., or thereabouts. Higher temperatures of initial curing and subsequent heating are permissible. However, they should not be so high as to volatilize the monomer (in initial cure) or to char or discolor the final product. The time of curing, of course, will vary greatly depending upon such factors as the size and thickness of the body to be formed and the temperature of reaction. Usually 5 minutes to 2 hours are sufficient. However, it is easy to determine by hardness tests when the articles are cured to hard, clear state.

It is an important advantage of the present invention that, while the boron stabilizer permits catalytic curing of the stabilized composition in a relatively short time, there is delay after the addition of the catalyst, with or without an accelerator such as cobalt naphthenate, before gelation begins. This delay, which is referred to herein for convenience as "pot life" is a highly desirable advantage because it gives the user a reasonable time interval to handle the material before the cure actually begins.

It is to be understood that while the boron compounds, taken by themselves, are excellent gelation inhibitors for copolymerizable mixtures of unsaturated polyesters and vinylic monomers, other conventional inhibitors, such as hydroquinone, can also be used. These may be employed, for example, in a proportion of approximately .001 to 0.4% by weight based upon the weight of the boron compound or such other proportion as is expedient.

The invention is illustrated, but not limited, by the following examples wherein parts and percentages are by weight unless otherwise indicated.

*Example 1*

23.5 parts maleic anhydride, 35.4 parts phthalic anhydride and 40.81 parts propylene glycol (representing a mol ratio of 0.5 mol maleic anhydride and 0.5 mol. phthalic anhydride to 1.13 mols of propylene glycol) were charged separately into a cooking kettle along with 7 parts of xylol. Included in the propylene glycol were 0.29 parts of $\beta$-trichloroborazole (equivalent to 0.216% trichloroborazole based on the weight of the final product).

The mixture was heated slowly to reflux 120° C.–150° C. with agitation. A slow stream of $CO_2$ was also fed in below the surface of the liquid.

As soon as reflux began, the $CO_2$ was turned off and reflux was continued without removing water of esterification for about one hour. A slow stream of $CO_2$ was again introduced below the surface of the liquid. Water was removed and heating at a temperature not in excess of 210° C. continued until an acid number of about 40–42 was obtained. At the indicated acid number, solvent was stripped from the reaction mixture under vacuum. The thus stripped reaction product was cooled to 135° C. at which time 0.049 part of hydroquinone (equivalent to 0.016% hydroquinone based on the weight of the final product) were added slowly with agitation for ten minutes. The mixture was then cooled to 110° C. and 33 parts of styrene were then added slowly with agitation to 67 parts of the above resin. The resulting mixture was then cooled to room temperature and stored without any tendency to gel. The product was heated to 57° C. but did not gel even after 54 days. Thereafter, 0.3% cobalt naphthenate (accelerator) and 1% methyl ethyl ketone peroxide (catalyst), based on the weight of the polyester/styrene mixture, were added to the stabilized mixture at room temperature (25° C.). Pot life of the thus modified mixture, i.e. the length of time before significant gelling begins, was found to be thirteen minutes. This is a highly desirable delay because it facilitates handling of the mass. However, the product set into a hard mass having a Barcol hardness of 77 in one hour along with excellent color and other characteristics. In comparison, a corresponding composition containing only 0.016% hydroquinone, i.e. containing no β-trichloroborazole had a stability of only 22 days. The latter product had a pot life when catalyzed as above of 25 minutes and gave a Barcol hardness of only 40 in one hour.

*Example 2*

The process of Example 1 was repeated, except that the β-trichloroborazole was added to the polyester reaction mixture at an acid number of 55. A stabilized product demonstrating essentially equivalent properties was obtained.

*Example 3*

The process of Example 1 was repeated except that .02% 4-tert. butyl catechol was used in lieu of the hydroquinone and 0.1% β-trichloroborazole was used in lieu of 0.216%. The resulting product remained stable for 46 days at 57° C. and showed a pot life of 16 minutes at 25° C. after the addition of the cobalt naphthenate and methyl ethyl ketone peroxide. Thereafter, however, the product set quickly and after 2 hours had a Barcol hardness of 70. The color and other characteristics of the set product were excellent.

*Example 4*

The process of Example 1 was repeated except that the amount of hydroquinone used was reduced to .0075% and 0.1% β-trichloroborazole and only 0.2% cobalt naphthenate was used to accelerate the set. Additionally, the β-trichloroborazole was added with the phthalic anhydride. The stabilized product, before addition of the accelerator and curing catalyst, remained gel-free for 29 days at 57° C. and demonstrated a pot life of six minutes upon adding the accelerator and catalyst. However, the catalyzed mass thereafter set quickly into a hard mass having a Barcol hardness of 80–87 in 30 minutes. Color and other characteristics were also good.

*Example 5*

The process of Example 4 was repeated except that the amounts of hydroquinone and β-trichloroborazole utilized were increased to .0125% and .1667%, respectively. This had the effect of increasing the pot life to 9.5 minutes while other characteristics, e.g. gelation time, Barcol, etc., remained essentially the same.

A further increase in the amounts of hydroquinone and trichloroborazole to .016% and .216%, respectively, extended the pot life to 12 minutes while retaining gelation time, color and Barcol characteristics.

The products of the invention may be put to any of the conventional uses for polyester and polyester/vinylic monomer compositions known in the art as illustrated by the abovementioned patents. Typical uses include glass mat impregnation, moldings, coatings and the like.

It will be appreciated that various modifications may be made in the invention described herein. Hence, the scope of the invention is defined in the following claims wherein:

We claim:

1. A composition comprising a polymerizable polyester of an α,β-ethylenically unsaturated dicarboxylic acid and a polyhydric alcohol and a stabilizing amount of a boron compound having the formula:

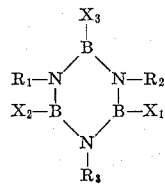

wherein $X_1$, $X_2$ and $X_3$ are halogen and $R_1$, $R_2$ and $R_3$ are selected from the group consisting of hydrogen, alkyl, alkoxy and aryl.

2. The composition of claim 1 including a vinylic monomer.

3. The composition of claim 1 wherein said acid is in the form of an anhydride.

4. The composition of claim 1 wherein said alcohol is propylene glycol and said acid is maleic anhydride.

5. The composition of claim 2 wherein said polyester is a mixed polyester of said acid and alcohol and another dicarboxylic acid.

6. The composition of claim 5 wherein said other acid is phthalic anhydride.

7. The composition of claim 1 including another gelation inhibitor.

8. The composition of claim 7 wherein said other inhibitor is hydroquinone.

References Cited by the Examiner

UNITED STATES PATENTS 2,892,864   6/1959   Groszos et al. _____ 260—551

MURRAY TILLMAN, *Primary Examiner.*